United States Patent
Ryu et al.

(10) Patent No.: US 9,830,750 B2
(45) Date of Patent: Nov. 28, 2017

(54) INTERFACE DEVICE, VEHICLE EXAMINING DEVICE CONNECTING WITH THE INTERFACE DEVICE, AND CONTROLLING METHOD OF THE VEHICLE EXAMINING DEVICE

(71) Applicant: HYUNDAI MOTOR COMPANY, Seoul (KR)

(72) Inventors: Seongpil Ryu, Yongin-si (KR); Dongjun Ahn, Anyang-si (KR); Young Jee Yang, Yongin-si (KR); JiTae Kim, Yongin-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 18 days.

(21) Appl. No.: 14/920,678

(22) Filed: Oct. 22, 2015

(65) Prior Publication Data

US 2016/0240021 A1 Aug. 18, 2016

(30) Foreign Application Priority Data

Feb. 12, 2015 (KR) .......................... 10-2015-0021692

(51) Int. Cl.
| | | |
|---|---|---|
| *G07C 5/00* | (2006.01) | |
| *G07C 5/08* | (2006.01) | |
| *G07C 5/02* | (2006.01) | |
| *G06N 99/00* | (2010.01) | |
| *G05B 23/02* | (2006.01) | |

(52) U.S. Cl.
CPC ................. *G07C 5/08* (2013.01); *G07C 5/02* (2013.01); *G07C 5/0816* (2013.01); *G05B 23/0267* (2013.01); *G06N 99/005* (2013.01)

(58) Field of Classification Search
CPC G07C 5/08; G07C 5/02; G06F 3/0482; G06F 3/04842; G06N 99/005
See application file for complete search history.

(56) References Cited

U.S. PATENT DOCUMENTS

| | | | | |
|---|---|---|---|---|
| 5,442,553 A * | 8/1995 | Parrillo | ..................... | G06F 8/65 455/420 |
| 6,141,610 A * | 10/2000 | Rothert | .................. | G07C 5/085 340/438 |
| 6,263,265 B1 * | 7/2001 | Fera | ..................... | B61L 27/0094 246/122 R |
| 6,263,322 B1 * | 7/2001 | Kirkevold | .......... | G06Q 30/0283 705/400 |
| 6,356,823 B1 * | 3/2002 | Iannotti | ............. | H04L 12/40032 369/21 |
| 6,405,111 B2 * | 6/2002 | Rogers | ................... | G07C 5/008 701/34.3 |
| 6,487,717 B1 * | 11/2002 | Brunemann | .............. | G06F 8/65 701/31.5 |
| 6,836,710 B2 * | 12/2004 | Yamaki | .................. | G07C 5/085 701/31.4 |

(Continued)

*Primary Examiner* — Behrang Badii
*Assistant Examiner* — Daniel L Greene
(74) *Attorney, Agent, or Firm* — McDermott Will & Emery LLP

(57) ABSTRACT

An interface device includes an input module for receiving evaluation data of a vehicle input by a user, and a display module for displaying one or more estimated causes corresponding to the evaluation data, wherein the input module receives one estimated cause selected from the estimated causes as a real cause.

12 Claims, 11 Drawing Sheets

(56) References Cited

U.S. PATENT DOCUMENTS

| | | | | |
|---|---|---|---|---|
| 7,047,142 B2* | 5/2006 | Wada | ............... | G01D 3/08 |
| | | | | 702/33 |
| 8,019,501 B2* | 9/2011 | Breed | ............... | B60J 10/00 |
| | | | | 701/31.9 |
| 8,060,274 B2* | 11/2011 | Boss | ............... | G06Q 10/06 |
| | | | | 340/994 |
| 2002/0133273 A1* | 9/2002 | Lowrey | ............... | G01M 15/04 |
| | | | | 701/29.4 |
| 2003/0053154 A1* | 3/2003 | Kamisuwa | ......... | H04N 1/00002 |
| | | | | 358/504 |
| 2014/0337057 A1* | 11/2014 | Shibata | ............... | G06F 19/321 |
| | | | | 705/3 |

\* cited by examiner

FIG. 3

| | OBJECT : | FUEL APPARATUS ▼ |
|---|---|---|
| | VERSION : | V0611 ▼ |
| 110-1 { | STATE OF VEHICLE : | FAULT DIAGNOSIS ▼ |
| | DRIVER'S ACTION : | SHUT DOWN ▼ |
| | FUNCTION : | FAIL SAFE REACTION ▼ |
| | PROBLEM : | FAIL SAFE MODE ENTRY FAILURE ▼ |

110-2 — ESTIMATED CAUSE :

| | ESTIMATED CAUSE | PROBABILITY |
|---|---|---|
| 1 | O O O | 55% |
| 2 | △ △ △ | 40% |
| 3 | X X X | 50% |

SOLUTION : [          ]

UPDATE ENGINE? : [ YES ]

FIG. 4

| | OBJECT : | FUEL APPARATUS ▼ |
|---|---|---|
| | VERSION : | V0611 ▼ |
| 110-1 { | STATE OF VEHICLE : | FAULT DIAGNOSIS ▼ |
| | DRIVER'S ACTION : | SHUT DOWN ▼ |
| | FUNCTION : | FAIL SAFE REACTION ▼ |
| | PROBLEM : | FAIL SAFE MODE ENTRY FAILURE ▼ |

110-2 — ESTIMATED CAUSE :

| | ESTIMATED CAUSE | PROBABILITY |
|---|---|---|
| 1 | O O O | 55% |
| 2 | △ △ △ | 40% |
| 3 | X X X | 50% |

110-3 — SOLUTION :

| | REAL CAUSE | SOLUTION |
|---|---|---|
| 2 | △ △ △ | ▫ ▫ ▫ |

110-4 — UPDATE ENGINE? : YES

INTERFACE DEVICE, VEHICLE EXAMINING DEVICE CONNECTING WITH THE INTERFACE DEVICE, AND CONTROLLING METHOD OF THE VEHICLE EXAMINING DEVICE

CROSS-REFERENCE TO RELATED APPLICATION

This application claims priority to Korean Patent Application No. 10-2015-0021692, filed on Feb. 12, 2015 in the Korean Intellectual Property Office, which is incorporated herein by reference in its entirety.

TECHNICAL FIELD

Embodiments of the present disclosure relate to an interface device, a vehicle examining device connecting with the interface device, and a method of controlling the vehicle examining device.

BACKGROUND

Embedded systems have been widely applied to various fields such as vehicles, mobile communication terminals, industrial automation, heavy industry equipment, home appliances, medicine and aerospace, leading to enhancement of performance and creation of new functions in products.

In embedded systems, software is modularized and standardized and software design specifications are standardized using XML for re-use of software and improvement in reliability. The embedded systems need to be tested to ensure quality of products.

Vehicle examining devices, which store examination results of embedded software of the embedded systems and causes of the examination results as a history, have been used for accurate detections of problems occurring in various electronic devices, including the embedded systems installed in a vehicle.

A user may judge and observe causes of problems occurring in the electronic devices by examining the embedded software of the electronic devices and monitoring the examination history by using the vehicle examining device.

SUMMARY OF THE DISCLOSURE

Therefore, it is an aspect of the present disclosure to provide a vehicle examining device automatically analyzing causes of problems occurring in an electronic device installed in a vehicle based on an examination result of the electronic device and a method of controlling the same.

It is another aspect of the present disclosure to provide an interface device allowing a user to directly input an examination result of an electronic device in a vehicle and displaying causes of problems occurring in the electronic device.

Additional aspects of the disclosure will be set forth in part in the description which follows and, in part, will be obvious from the description, or may be learned by practice of the disclosure.

In accordance with one aspect of the present disclosure, an interface device includes an input module for receiving evaluation data of a vehicle input by a user, and a display module for displaying one or more estimated causes corresponding to the evaluation data, wherein the input module receives one estimated cause selected from the estimated causes as a real cause.

The input module may receive a solution for the real cause input by the user.

The interface device may further include a communication module configured to transmit a signal to, and receive a signal from, a vehicle examination apparatus analyzing the one or more estimated causes based on a mapping model.

The input module may receive whether to update the mapping model.

In accordance with another aspect of the present disclosure, a vehicle examining device includes a storage module for storing a mapping model, and a cause analyzing module for analyzing an estimated cause corresponding to evaluation data input by a user based on the mapping model.

The vehicle examining device may further include a display module configured to display the estimated cause to the user, and an input module configured to receive one estimated cause selected out of one or more estimated causes as a real cause from the user.

The cause analyzing module may store an evaluation result including the evaluation data and the real cause in the storage module.

The input module may receive a solution input by the user, and the cause analyzing module may store an evaluation result including the evaluation data, the real cause, the solution, and the estimated cause in the storage module.

The storage module may store a refined evaluation result as sampling data.

The vehicle examining device may further include a cause learning module configured to update the mapping model, wherein the storage module stores sampling data respectively corresponding to a plurality of evaluation results, and the cause learning module updates the mapping model based on the sampling data.

The vehicle examining device may further include a performance test module configured to test performance of the mapping model on the basis of at least one performance index.

The vehicle examining device may further include a communication module configured to receive the evaluation data input by the user from an interface device and transmit the estimated cause to the interface device.

The communication module may receive one estimated cause selected by the user out of one or more estimated causes from the interface device as a real cause.

The cause analyzing module may store an evaluation result including the evaluation data and the real cause in the storage module.

The communication module may receive a solution input by the user from the interface device, and the cause analyzing module may store an evaluation result including the evaluation data, the real cause, the solution, and the estimated cause in the storage module.

The vehicle examining device may further include a cause learning module configured to update the mapping model, wherein the storage module stores sampling data respectively corresponding to a plurality of evaluation results, and the cause learning module updates the mapping model based on the sampling data.

In accordance with another aspect of the present disclosure, a method of controlling a vehicle examining device includes receiving evaluation data of a vehicle from a user by an input module, analyzing an estimated cause corresponding to the evaluation data based on a mapping model stored in a storage module by a cause analyzing module, and displaying one or more estimated causes corresponding to the evaluation data by a display module.

The method may further include receiving one estimated cause selected out of the one or more estimated causes as a real cause by the input module.

The method may further include storing an evaluation result including the evaluation data and the real cause in the storage module by the cause analyzing module.

The method may further include generating storing sampling data corresponding to the evaluation result and storing the generated sampling data in the storage module by a cause learning module, and updating the mapping model based on the sampling data respectively corresponding to a plurality of evaluation results stored in the storage module by the cause learning module.

BRIEF DESCRIPTION OF THE DRAWINGS

These and/or other aspects of the disclosure will become apparent and more readily appreciated from the following description of the embodiments, taken in conjunction with the accompanying drawings of which:

FIGS. 2 to 4 are diagrams exemplarily illustrating screens displayed by a display module of the vehicle examining device;

DETAILED DESCRIPTION

Figure 1:
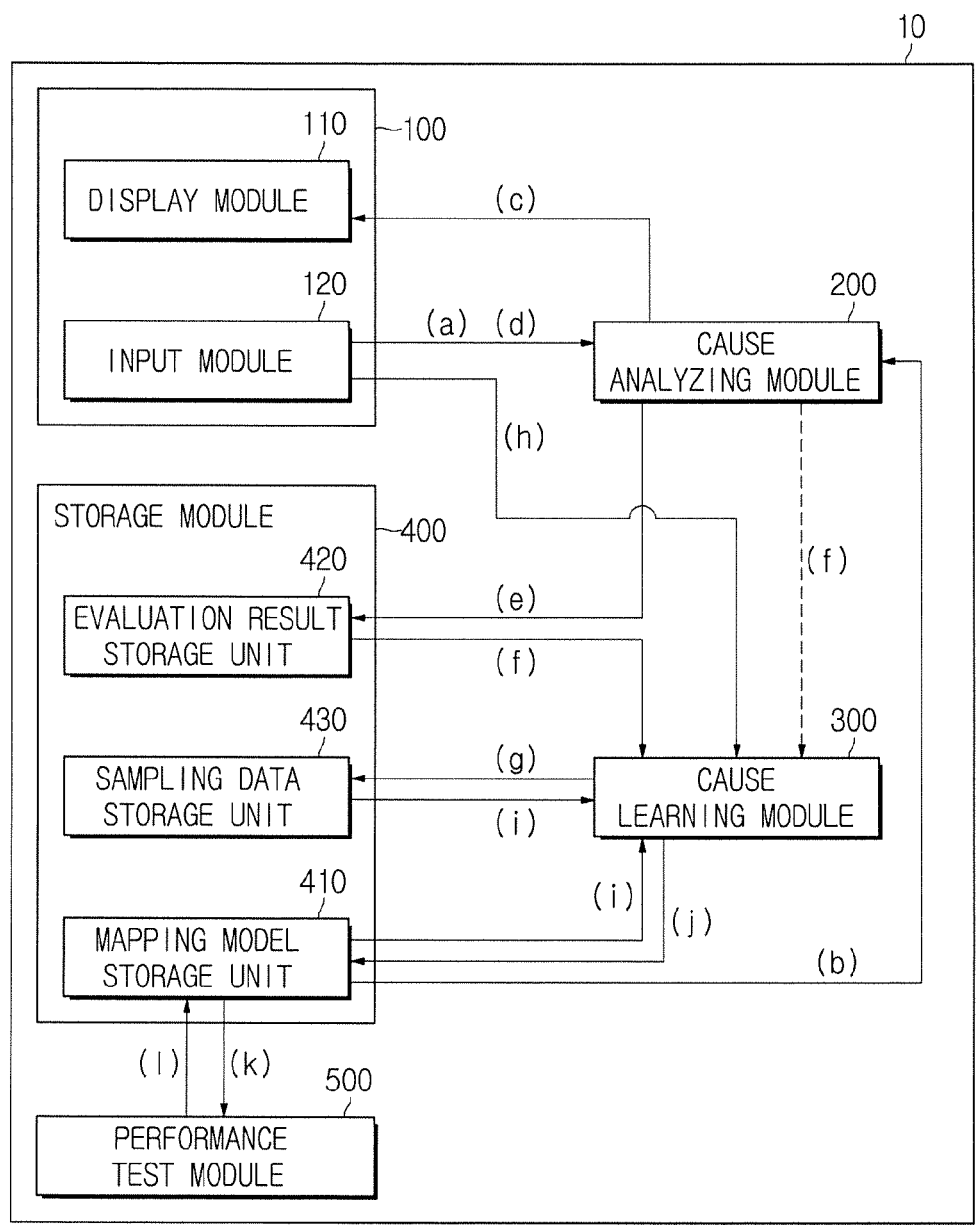
FIG. 1 is a control block diagram illustrating a vehicle examining device according to an embodiment.

Reference will now be made in detail to the embodiments of the present disclosure, examples of which are illustrated in the accompanying drawings, wherein like reference numerals refer to like elements throughout. In the drawings, the same or similar elements are denoted by the same reference numerals even though they are depicted in different drawings. In the following description of the present disclosure, a detailed description of known functions and configurations incorporated herein will be omitted when it may make the subject matter of the present disclosure rather unclear. In addition, terms in the following description, such as first, second, etc., are used to discriminate one element from other elements, but do not limit such elements.

Figure 2:
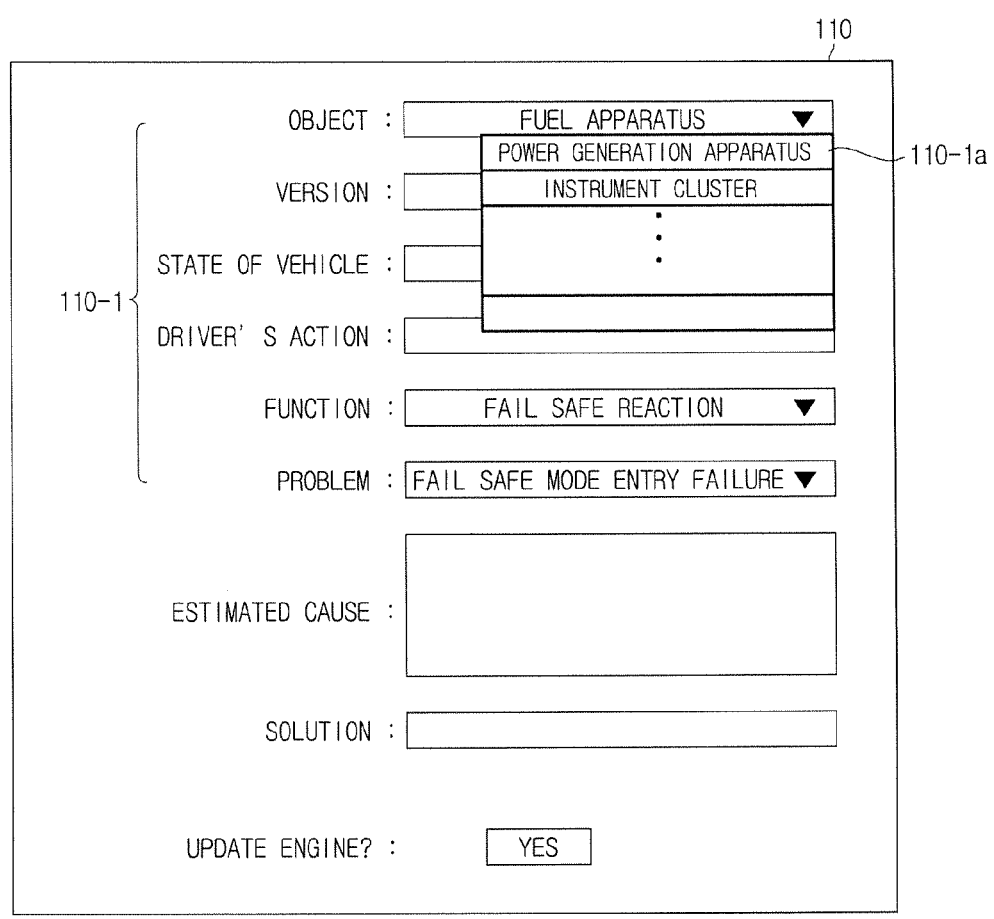

Hereinafter, the construction and operation of a vehicle examining device according to an embodiment of the present disclosure will be described in detail with reference to FIGS. 1 to 7. FIG. 1 is a control block diagram illustrating a vehicle examining device according to an embodiment. FIGS. 2 to 4 are diagrams exemplarily illustrating screens displayed by a display module of the vehicle examining device.

Referring to FIG. 1, a vehicle examining device 10 may include a display module 110 configured to display various contents to a user, an input module 120 configured to receive a command from a user, a cause analyzing module 200 configured to analyze estimated causes corresponding to an examination result input by the user, a cause learning module 300 configured to update a mapping model based on a real cause input by the user, a storage module 400 configured to store programs of the vehicle examining device 10 and various data used in the vehicle examining device 10, and a performance test module 500 configured to test performance of the mapping model.

Since the display module 110 displays items that requires a user's input, the user may input a command through the input module 120 while watching the items.

The display module 110 also may display at least one estimated cause corresponding to an examination result (hereinafter, referred to as "evaluation data") input by the user as an analysis result of the cause analyzing module 200, which will be described later.

The display module 110 may be implemented using a plasma display panel (PDP), a light emitting diode (LED), a liquid crystal display (LCD) or by using similar means.

The display module 110 may also be implemented using a three-dimensional display that displays a stereoscopic image.

The display module 110 may include a touchscreen. If the display module 110 includes a touchscreen, the display module 110 may also serve as the input module 120. The touchscreen may be implemented using a pressure-sensitive touchscreen panel or a capacitive touchscreen panel. In addition, the touchscreen may be implemented using a touchscreen panel using ultrasound or infrared light.

A screen displayed by the display module 110 will be described later with reference to FIGS. 2 through 4.

The input module 120 may allow the user to input various control commands with regard to the vehicle examining device 10, and may include a plurality of screens such that the user may input a command while watching the display module 110 that displays the plurality of screens.

According to an embodiment, the user may input evaluation data to the vehicle examining device 10 through the input module 120.

For example, when the display module 110 displays a plurality of evaluation data items for a given examination item, the user may select one evaluation data item through the input module 120, thereby inputting evaluation data corresponding to the given examination data item.

In addition, the user may create a keyword pertaining to one examination item through the input module 120 and input the created keyword as the evaluation data.

The user may also input the evaluation data through the input module 120 by using various other methods, and the methods are not limited thereto.

The user may also input a real cause through the input module 120.

For example, when the display module 110 displays a plurality of estimated causes corresponding to the evaluation data, the user may select one of the estimated causes through the input module 120, thereby inputting the selected estimated cause as a real cause.

The user may also input a solution for the real cause through the input module 120. The solution may be input as text and the input solution for the real cause may be stored in the storage module 400, which will be described later, together with the real cause.

The user may also input whether to update a mapping model stored in the storage module 400 through the input module 120.

For example, when the display module 110 displays an icon to select whether to update the mapping model and the user selects "yes" through the input module 120, the cause learning module 300, which will be described later, may update the stored mapping model.

Although the input module 120 includes the touchscreen as described above, the input module 120 is not limited thereto and may also include a hard key, a jog dial, a keyboard, a mouse and a remote control which are separated from the display module 110.

Meanwhile, the display module 110 and the input module 120 may be implemented as an interface device 100 separated from the vehicle examining device 10. The interface device 100 may include all types of handheld devices such as a personal communication system (PCS), a global system for mobile communications (GSM), a personal digital cellular (PDC), a personal handyphone system (PHS), a personal digital assistant (PDA), an International Mobile Telecommunications-2000 (IMT-2000) terminal, a Code Division Multiple Access-2000 (CDMA-2000) terminal, a Wideband Code Division Multiple Access (W-CDMA) terminal, a Wireless Broadband Internet (WiBro) terminal, a portable multimedia player (PMP) terminal, a smart phone, notebooks, laptops, tablet PCs and slate PCs mounted with a WEB Browser.

If the display module 110 and the input module 120 are implemented as a separate interface device 100, the interface device 100 and the vehicle examining device 10 respectively include communication modules (not shown) connected to each other via wired or wireless networks such that the interface device 100 may transmit/receive a control command (e.g., a command to select an estimated cause) input to the input module 120 or a control signal of the display module 110 to display contents to/from the vehicle examining device 10.

The cause analyzing module 200 may analyze estimated causes based on the evaluation data input by the user.

In an embodiment, when evaluation data is input by the user (a), the cause analyzing module 200 retrieves a mapping model from a mapping model storage unit 410 of the storage module 400(b) and detects one or more estimated causes corresponding to the input evaluation data based on the mapping model. The one or more estimated causes are displayed on the display module 110(c).

The mapping model may be an algorithm for detecting an estimated cause corresponding to given evaluation data or information including one or more estimated causes corresponding to various evaluation data and a probability that each estimated cause is a real cause. The mapping model may be updated by the cause learning module 300, which will be described later.

For example, if the mapping model is an algorithm, the cause analyzing module 200 may substitute the evaluation data input by the user into the mapping model and detect an estimated cause corresponding to a substitution result. The estimated cause corresponding to the substitution result may be pre-stored in the cause analyzing module 200. In addition, the cause analyzing module 200 may calculate a probability that the estimated cause is a real cause in accordance with detection frequency of the estimated cause.

For example, if the mapping model is information including one or more estimated causes corresponding to various evaluation data and the probability that each estimated cause is the real cause, the cause analyzing module 200 may detect one or more estimated causes corresponding to the evaluation data input by the user and probability corresponding to each estimated cause from the mapping model storage unit 410.

Then, when the user selects one estimated cause among the one or more estimated causes as the real cause through the input module 120(d), the cause analyzing module 200 stores the evaluation data and the real cause input by the user in an evaluation result storage unit 420 of the storage module 400(e). The input evaluation data and real cause are stored as one "evaluation result".

Meanwhile, the user may input a solution for the real cause through the input module 120. In this case, the cause analyzing module 200 may store the input evaluation data, real cause, and solution in the evaluation result storage unit 420 as one evaluation result. Accordingly, one evaluation result may include the input evaluation data, real cause and solution.

The cause analyzing module 200 may also store the detected one or more estimated causes in the evaluation result storage unit 420. In this case, one evaluation result may include the input evaluation data, the detected estimated causes, the input real cause and the input solution.

The evaluation result will be described in detail later with reference to FIG. 5.

The cause learning module 300 may generate sampling data based on the newly stored evaluation result and store the sampling data. When a command to update the mapping model is input by the user, the cause learning module 300 updates the mapping model based on sampling data respectively corresponding to the one or more evaluation results stored in a sampling data storage unit 430.

The cause learning module 300 may retrieve the evaluation result generated and stored by the cause analyzing module 200 from the evaluation result storage unit 420(f) and generate sampling data based on the evaluation result.

For example, the cause learning module 300 may convert the data type of the evaluation result into one suitable for the data type supported by the mapping model stored in the mapping model storage unit 410. In this case, the cause learning module 300 may store the converted evaluation result in the sampling data storage unit 430 as sampling data (g).

In addition, the cause learning module 300 may generate sampling data from a refined evaluation result obtained by removing unnecessary data included in the evaluation result and classifying the evaluation data included in the evaluation result on an item basis, and may store the sampling data in the sampling data storage unit 430(g).

Meanwhile, the cause learning module 300 may also directly receive the evaluation result generated by the cause analyzing module 200 from the cause analyzing module 200(f), without being limited to retrieving the evaluation result from the evaluation result storage unit 420.

The sampling data will be described in detail later with reference to FIG. 6.

Then, when the user inputs a command to update the mapping model (h), the cause learning module 300 retrieves sampling data respectively corresponding to the one or more evaluation results stored in the sampling data storage unit 430 and the mapping model stored in the mapping model storage unit 410(i).

Then, the cause learning module 300 updates the mapping model based on the sampling data stored in the sampling data storage unit 430 and stores the updated mapping model in the mapping model storage unit 410(j).

For example, if the mapping model is an algorithm, the cause learning module 300 may modify or add (i.e., update) a path of the algorithm that detects estimated causes respectively corresponding to each evaluation result based on the sampling data stored in the sampling data storage unit 430. The algorithm may be, for example, a Bayesian algorithm or a Support Vector Machine (SVM) algorithm.

If the mapping model is information including one or more estimated causes corresponding to various evaluation data and the probability, the cause learning module 300 may modify or add (i.e., update) the estimated causes corresponding to each evaluation data and the probability thereof by applying a machine learning algorithm to the sampling data stored in the sampling data storage unit 430.

The machine learning algorithm may be, for example, a Bayesian algorithm or a SVM algorithm The updated mapping model may be stored in the mapping model storage unit 410 and used to analyze the estimated causes by the cause analyzing module 200 upon receiving new evaluation data from the user.

The performance test module 500 may test and optimize performance of the mapping model.

For example, if the mapping model is an algorithm, the performance test module 500 retrieves the updated mapping model and non-updated mapping model from the mapping model storage unit 410 of the storage module 400(k), calculates grades of each mapping model on the basis of a performance index (e.g., accuracy, precision, and recall) and transmits calculation results to the display module 110 as test results.

In this case, the display module 110 may display the test results to the user, the user may select one of the updated mapping model and non-updated mapping model through the input module 120, and the performance test module 500 may store the selected mapping model in the mapping model storage unit 410 as a new mapping model (l).

In addition, for example, if the mapping model is information including one or more estimated causes corresponding to various evaluation data and the probability, the performance test module 500 retrieves the mapping model stored in the mapping model storage unit 410 of the storage module 400(k), calculates grades of the mapping model on the basis of the performance index according to types of the machine learning algorithm, and transmits calculation results to the display module 110 as test results.

In this case, the display module 110 may display the test results to the user, the user may select one machine learning algorithm through the input module 120, and the performance test module 500 may store a new mapping model in the mapping model storage unit 410 by applying the selected machine learning algorithm to the mapping model (l).

Since the performance test module 500 is not an essential element, it may be dispensed with.

The cause analyzing module 200, the cause learning module 300, and the performance test module 500 may include a processor configured to perform analysis or calculation, a read only memory (ROM) configured to store control programs to control the display module 110 and the storage module 400, and a random access memory (RAM) configured to store a signal or data input from the outside of the vehicle examining device 10 or used as a storage corresponding to various operations performed by the vehicle examining device 10.

In addition, the cause analyzing module 200, the cause learning module 300, and the performance test module 500 may include a processing board such as a graphic processing board.

The processor, RAM, and ROM may be interconnected via an internal bus.

In addition, the cause analyzing module 200, the cause learning module 300, and the performance test module 500 may be used as terms indicating constituent elements including a processor, a RAM and a ROM. The cause analyzing module 200, the cause learning module 300, and the performance test module 500 may also be used as terms indicating constituent elements including a processor, a RAM, a ROM and a processing board.

The storage module 400 may include the mapping model storage unit 410 to store the mapping model, the evaluation result storage unit 420 to store at least one evaluation result and the sampling data storage unit 430 to store the sampling data. Further, the storage module 400 may also include various data, programs, or applications used to respectively drive and control the constituent elements of the vehicle examining device 10.

The mapping model storage unit 410 may store not only recently updated mapping models but also non-updated mapping model.

For example, if the mapping model is an algorithm, the mapping model storage unit 410 may store a determination path of the algorithm corresponding to each evaluation data. If the mapping model is information including one or more estimated causes corresponding to various evaluation data and the probability, the mapping model storage unit 410 may store one or more estimated causes corresponding to each evaluation data and information about the probability that each estimated cause is a real cause.

In addition, if the mapping model is information including one or more estimated causes corresponding to various evaluation data and the probability, the mapping model storage unit 410 may also store information about the applied machine learning algorithm.

The evaluation result storage unit 420 may accumulate one or more evaluation data and real causes corresponding to each evaluation data as one evaluation result in a database. The evaluation data may be classified and stored on the basis of examination items. That is, one evaluation result may include evaluation data and real causes corresponding thereto on the basis of the evaluation data items, and the evaluation result storage unit 420 may store one or more evaluation results.

In addition, the evaluation result storage unit 420 may store one or more evaluation data, estimated causes analyzed correspondingly to each evaluation data, and solutions for the real causes input by the user.

The sampling data storage unit 430 stores sampling data corresponding to each evaluation result.

The sampling data storage unit 430 may store sampling data corresponding to data types supported by the mapping model stored in the mapping model storage unit 410.

The sampling data storage unit 430 evaluation results (for example, keywords for the evaluation data items and keywords for the real causes corresponding to the evaluation data) may be refined by the cause learning module 300.

The storage module 400 may include at least one storage medium selected from the group consisting of a flash memory, a hard disc drive, a memory card, a read-only memory (ROM), a random access memory (RAM), an electrically erasable programmable read-only memory (EEPROM), a programmable read-only memory (PROM), a magnetic memory, a magnetic disc and an optical disc.

Hereinafter, the vehicle examining device 10 will be described in more detail with reference to FIGS. 2 through 4.

The display module 110 of the vehicle examining device 10 displays various contents that requires a user's input.

Referring to FIG. 2, the display module 110 may display an examination object, a version of an embedded software, a current state of the vehicle, and a driver's action as an examination item 110-1 of an electronic device of a vehicle including an embedded system. When the user selects an examination item (for example, "object" of 110-1) through the input module 120, the display module 110 may display one or more evaluation data items 110-1*a* corresponding to the selected examination item ("object" of 110-1).

The user may select one of the evaluation data items 110-1*a* (for example, "fuel apparatus" of 110-1*a*) through the input module 120.

Although not shown herein, the display module 110 may display one or more detailed evaluation data items corresponding to the selected evaluation data item ("fuel apparatus" of 110-1*a*), and the user may select one of the detailed evaluation data items through the input module 120.

The evaluation data item and detailed evaluation data item selected in each examination item 110-1 are transmitted to the cause analyzing module 200 as evaluation data.

Although not shown herein, the user may directly input evaluation data corresponding to each examination item 110-1 as text or keywords through the input module 120. In this case, the input texts or keywords may be transmitted to the cause analyzing module 200 as evaluation data.

Then, referring to FIG. 3, the display module 110 may display one or more estimated causes 110-2 detected based on the evaluation data received by the cause analyzing module 200. In this case, the display module 110 may display only a predetermined number of estimated causes (e.g., three estimated causes) having high probabilities among the one or more estimated causes detected by the cause analyzing module 200.

For example, the display module 110 may display i) Fail Safe logic execution error, ii) Fail Safe function specification disclosure error, and iii) basic software execution error as the estimated causes 110-2 for the input evaluation data.

The display module 110 may also display a probability that each estimated cause 110-2 detected by the cause analyzing module 200 is a real cause.

Then, referring to FIG. 4, the user may select one estimated cause with the highest probability (e.g., "No. 2" of 110-2) among the one or more estimated causes 110-2 through the input module 120, and transmit the selected estimated cause ("No. 2" of 110-2) to the cause analyzing module 200 as a real cause.

In this case, the display module 110 displays the selected estimated cause ("No. 2" of 110-2) as the real cause, and the user may input a solution for the displayed real cause through the input module 120.

The input solution and the real cause may be transmitted to the cause analyzing module 200 and stored in the evaluation result storage unit 420 as an evaluation result.

In addition, the display module 110 may further display an icon 110-4 to receive an instruction to update the mapping model, and the user may instruct the cause learning module 300 to update the mapping model by clicking, or otherwise interacting with, the icon 110-4 through the input module 120.

Meanwhile, since FIGS. 2 to 4 illustrate examples of contents displayed by the display module 110, the contents displayed by the display module 110 are not limited thereto.

Hereinafter, the evaluation result, the sampling data, and the mapping model stored in the storage module 400 will be described in more detail with reference to FIGS. 5 to 7.

Figure 5:
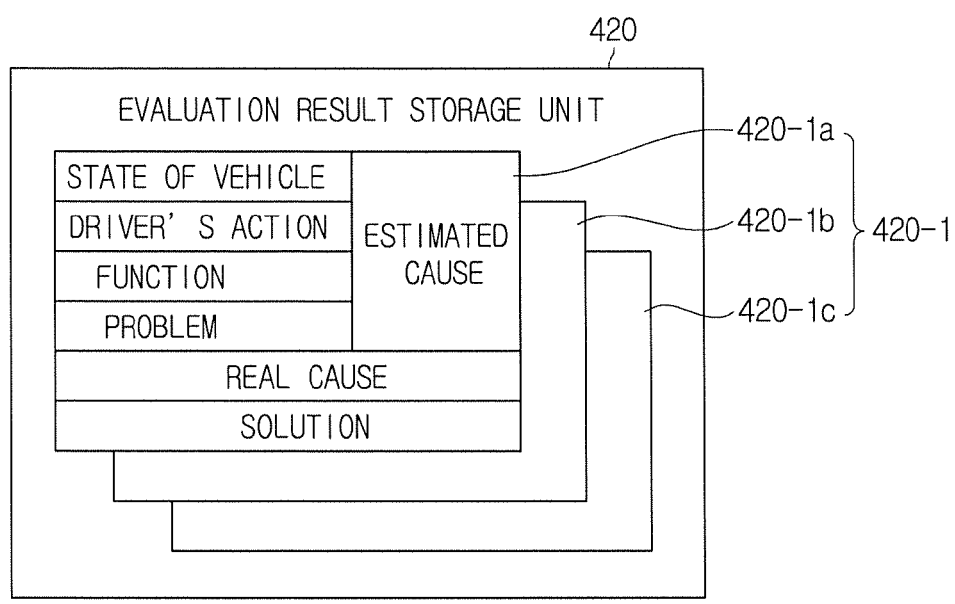
FIG. 5 is a diagram exemplarily illustrating evaluation results stored in an evaluation result storage unit.

FIG. 5 is a diagram illustrating, through exemplary means, evaluation results stored in an evaluation result storage unit 420. FIG. 6 is a diagram illustrating, through exemplary means, sampling data stored in a sampling data storage unit 430. FIG. 7 is a diagram illustrating, through exemplary means, a mapping model stored in a mapping model storage unit 410.

Referring to FIG. 5, the evaluation result storage unit 420 of the storage module 400 may store one or more evaluation results 420-1.

The evaluation result 420-1 includes information about the evaluation data and real cause input by the user.

When the user inputs new evaluation data and real cause, the evaluation result storage unit 420 stores a new evaluation result 420-1*a* including the newly input evaluation data and the real cause corresponding thereto.

The evaluation result storage unit 420 may accumulate the new evaluation result in a database.

In this case, the evaluation result storage unit 420 may store not only the newly stored evaluation result 420-1*a* but also previously stored evaluation results 420-1*b* and 420-1*c*.

In addition, the evaluation result storage unit 420 may also store an evaluation result 420-1 including estimated causes detected by the cause analyzing module 200 for the evaluation data and solutions input by the user.

Figure 6:
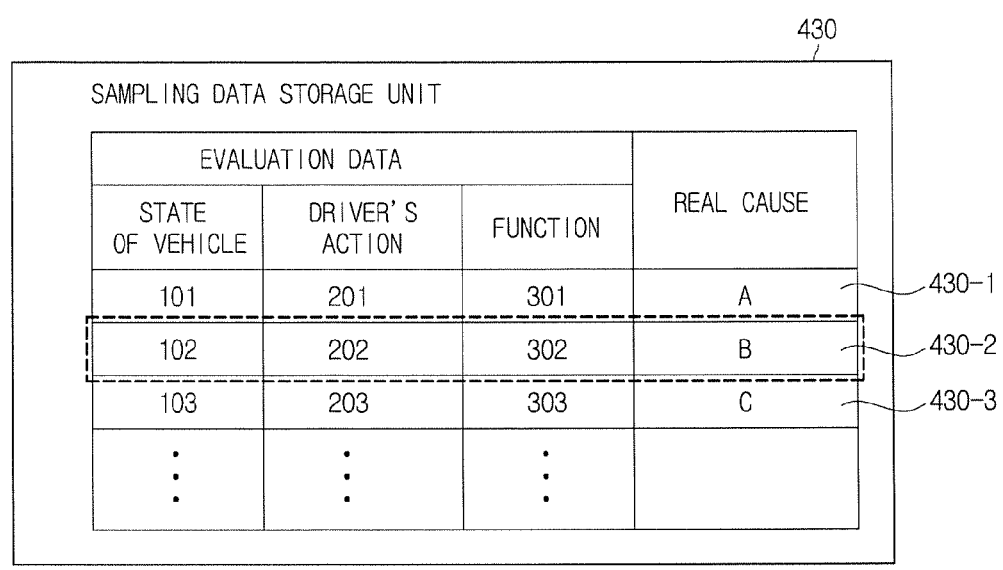
FIG. 6 is a diagram exemplarily illustrating sampling data stored in a sampling data storage unit.

Referring to FIG. 6, the sampling data storage unit 430 may store sampling data corresponding to each evaluation result stored in the evaluation result storage unit 420.

The sampling data refers to data obtained by converting the data type of the evaluation result, and removing unnecessary data therefrom.

When the evaluation result storage unit 420 stores the new evaluation result, the cause learning module 300 generates new sampling data 430-2 based on the new evaluation result and stores the new sampling data 430-2 in the sampling data storage unit 430.

In the sampling data storage unit 430, the new sampling data 430-2 may be accumulated in a database.

In this case, the sampling data storage unit 430 may store not only the newly stored sampling data 430-2 but also previously stored sampling data 430-1 and 430-3.

For example, if the mapping model supports a numerical format for the evaluation data, the sampling data may include evaluation data converted into the numerical format. Alternatively, if the mapping model supports an alphabetical format for the real cause, the sampling data may include a real cause converted into the alphabetical format.

In addition, sampling data may include, for example, evaluation data classified on the basis of the examination items (such as "state of the vehicle", "driver's action" and "function").

Figure 7:
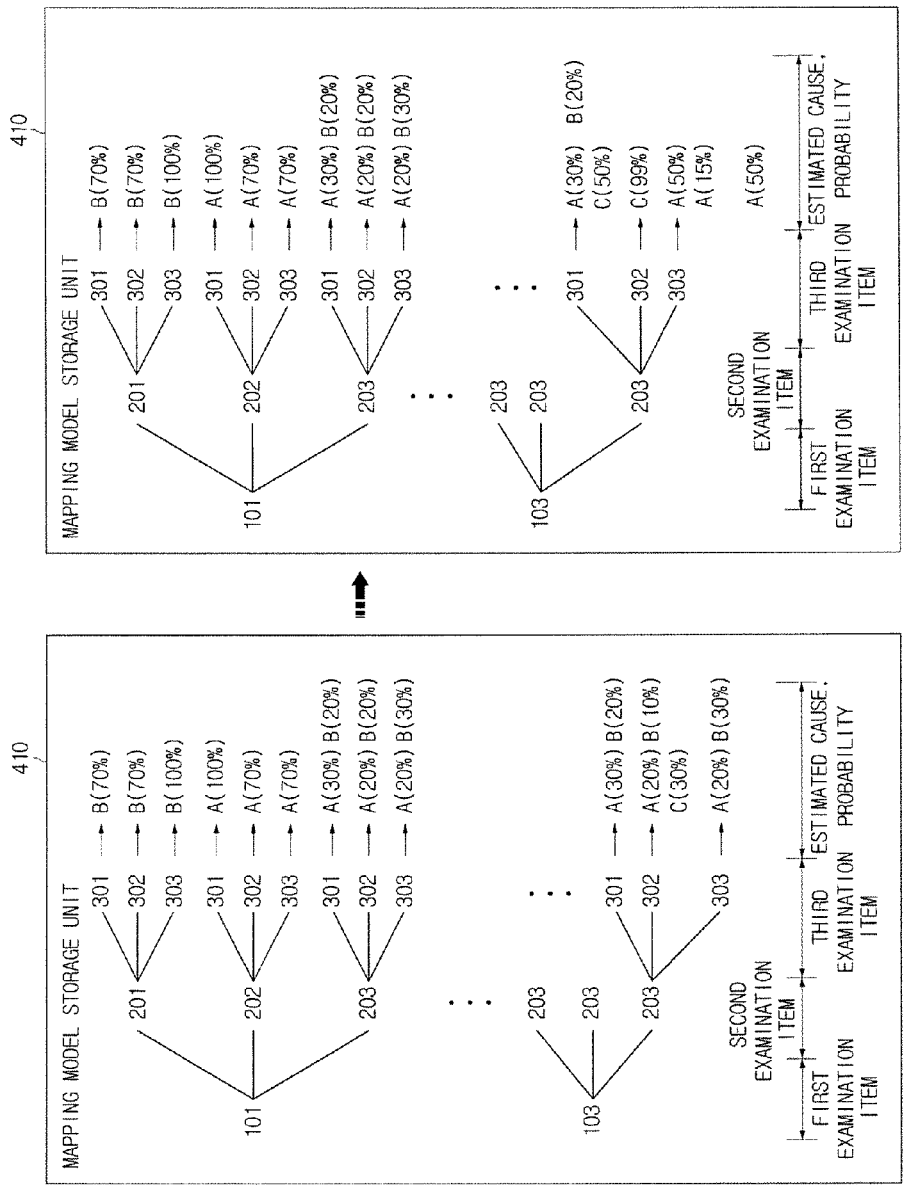
FIG. 7 is a diagram exemplarily illustrating a mapping model stored in a mapping model storage unit.

Referring to FIG. 7, the mapping model storage unit 410 may store the mapping model.

For example, if the mapping model is an algorithm, the mapping model storage unit 410 may store an algorithm to obtain evaluation data respectively for a first examination item (for example, "state of the vehicle"), a second examination item (for example, "driver's action") and a third examination item (for example, "function") and estimated causes therefor.

Referring to a left diagram of FIG. 7, when evaluation data corresponding to examination items 103, 203 and 302 is input before the mapping model is updated, the cause analyzing module 200 detects A, B and C as estimated causes corresponding to the examination items 102, 203 and 302 by applying an existing mapping model thereto. When the estimated cause A is detected with a frequency of 20%, the estimated cause B is detected with a frequency of 10%, and the estimated cause C is detected with a frequency of 30%, the cause analyzing module 200 assigns a probability of 20% to the estimated cause A, a probability of 10% to the estimated cause B, and a probability of 30% to the estimated cause C. The detected estimated causes and probabilities are displayed via the display module 110.

When the user inputs a real cause (e.g., "C") for the evaluation data and a command to update the mapping model, the cause learning module 300 may update the mapping model as illustrated in a right diagram of FIG. 7.

When evaluation data corresponding to the examination items 103, 203 and 302 is input after the mapping model is updated, the cause analyzing module 200 detects the estimated cause C corresponding to the examination items 103, 203 and 302 by applying the updated mapping model thereto. When the estimated cause C is detected with a frequency of 99%, the cause analyzing module 200 may assign a probability of 99% to the estimated cause C.

For example, if the mapping model is information including one or more estimated causes corresponding to various evaluation data and the probability, the mapping model storage unit 410 may store one or more estimated causes respectively corresponding to the various evaluation data and probabilities corresponding to each estimated cause.

Referring to the left diagram of FIG. 7, when evaluation data corresponding to examination items 103, 203 and 302 is input before the mapping model is updated, the cause analyzing module 200 may detect A, B and C as estimated causes corresponding to the examination items 102, 203 and 302 with reference to the existing mapping model and calculate probabilities corresponding to each estimated cause. The detected estimated causes and probabilities are displayed via the display module 110.

When the user inputs a real cause (e.g., "C") for the evaluation data and a command to update the mapping model, the cause learning module 300 may update the mapping model as illustrated in the right diagram of FIG. 7.

When evaluation data corresponding to the examination items 103, 203 and 302 is input after the mapping model is updated, the cause analyzing module 200 may detect the estimated cause C corresponding to the examination items 103, 203 and 302 with reference to the updated mapping model and may assign a probability of 99% to the estimated cause C.

Hereinafter, the operation of the vehicle examining device 10 will be described in more detail with reference to FIGS. 8 and 9.

Figure 8:
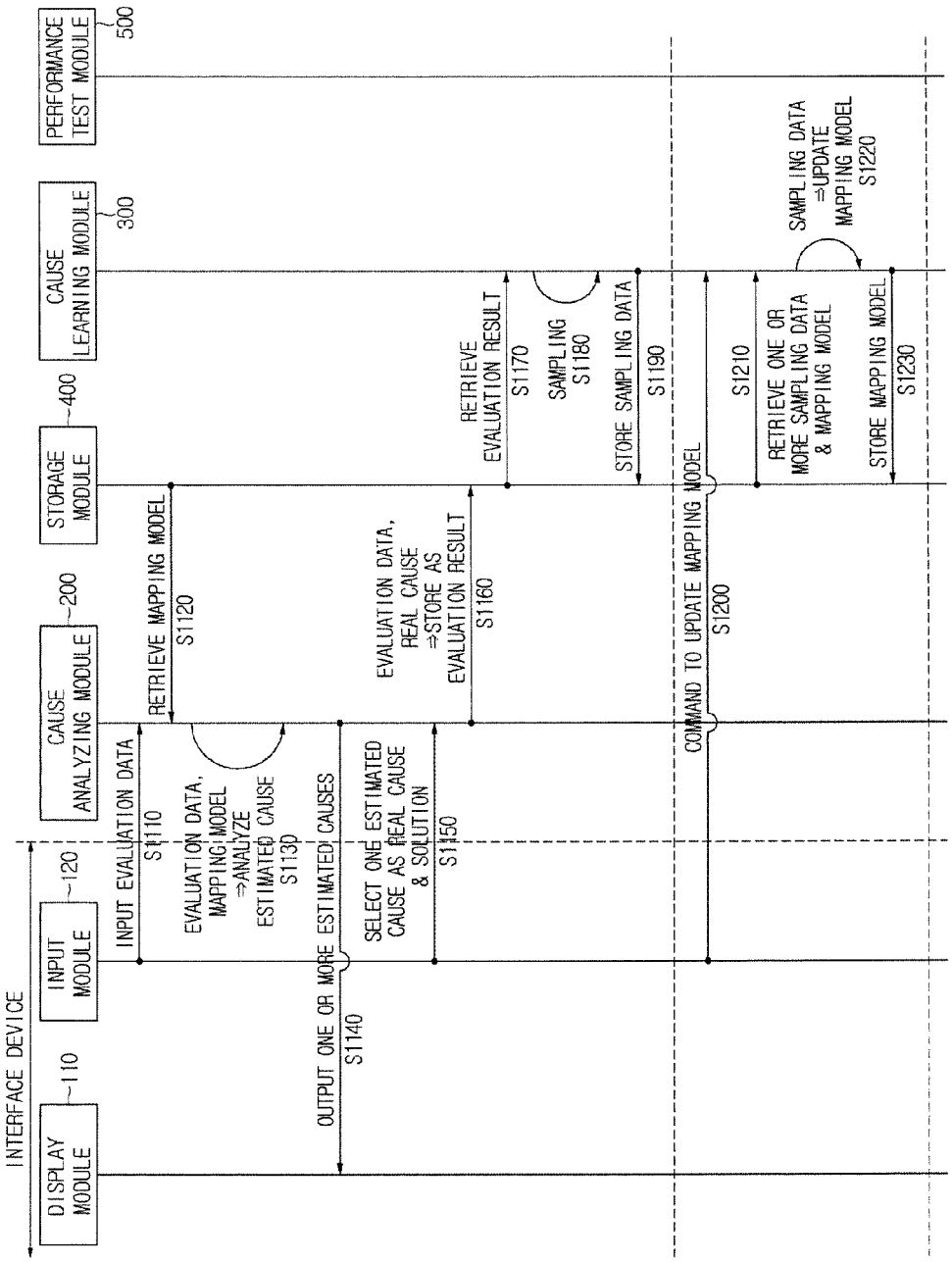
FIGS. 8 and 9 are flowcharts illustrating a method of controlling a vehicle examining device according to an embodiment.
Figure 9:
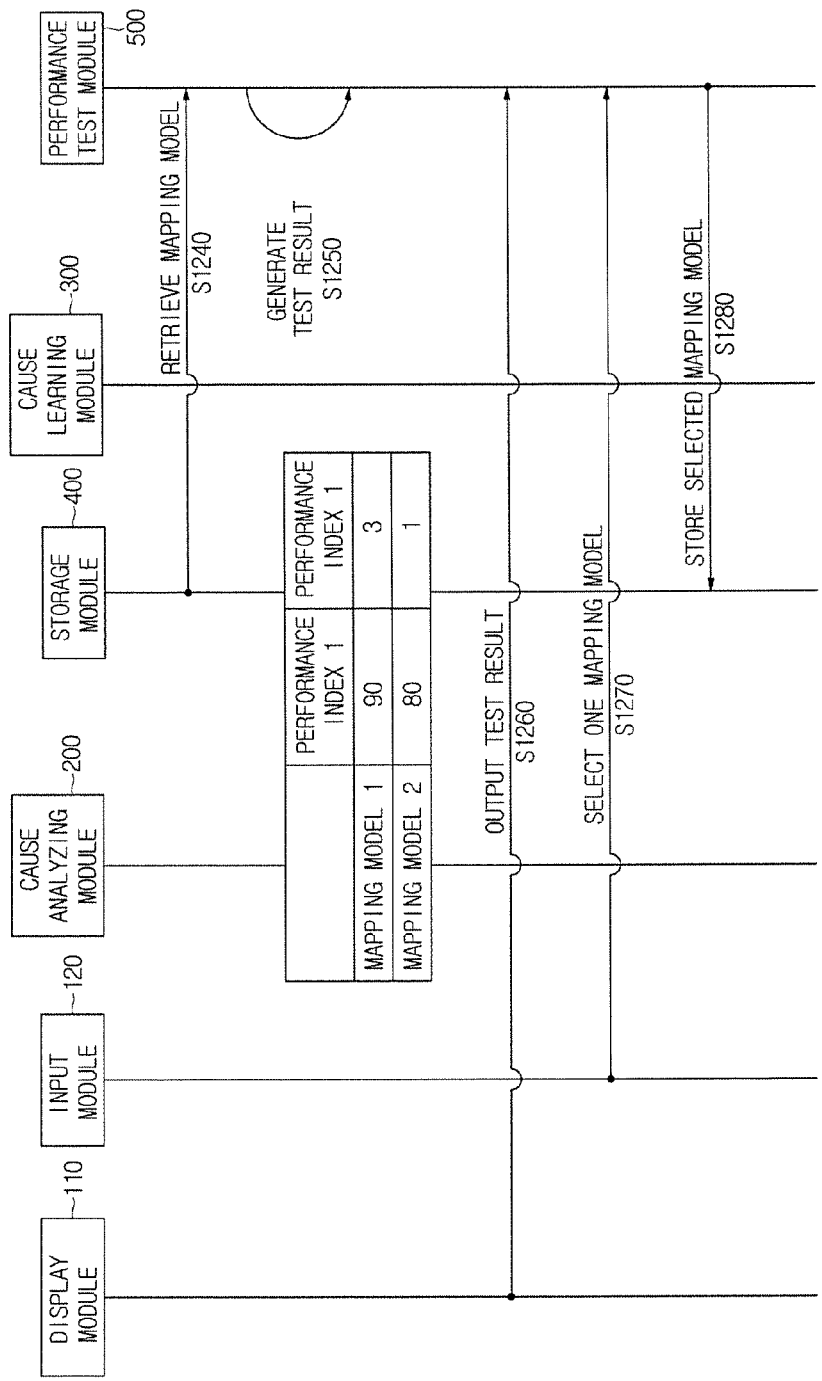

FIGS. 8 and 9 are flowcharts illustrating a method of controlling a vehicle examining device 10 according to an embodiment.

Referring to FIG. 8, the cause analyzing module 200 receives evaluation data input by the user from the input module 120 (S1110).

Then, the cause analyzing module 200 retrieves the mapping model from the mapping model storage unit 410 of the storage module 400 (S1120) and analyzes estimated causes corresponding to the evaluation data based on the mapping model (S1130). Via the analysis of the estimated causes performed by the cause analyzing module 200, one or more estimated causes and probabilities of each estimated cause may be detected.

Then, the cause analyzing module 200 transmits the analyzed estimated causes to the display module 110 such that the one or more estimated causes and probabilities of estimated causes are displayed on the display module 110 (S1140).

Then, the cause analyzing module 200 receives a real cause input by the user from the input module 120 (S1150). The input real cause may be one of the estimated causes displayed on the display module 110.

In this case, the cause analyzing module 200 may receive a solution input by the user from the input module 120 together with the real cause (S1150).

Then, the cause analyzing module 200 stores the evaluation data and real cause input by the user as one evaluation result in the evaluation result storage unit 420 of the storage module 400 (S1160).

In this case, the cause analyzing module 200 may also store the one or more estimated causes displayed on the display module 110 and the solution input by the user in the evaluation result storage unit 420 together with the evaluation data and the real cause as one evaluation result.

Then, the cause learning module 300 receives an evaluation result recently stored in the evaluation result storage unit 420 (S1170) and generates sampling data based on the received evaluation result (S1180). The process of generating the sampling data is described above, and detailed descriptions thereof will not be repeated herein.

The cause learning module 300 then stores the generated sampling data in the sampling data storage unit 430 of the storage module 400 (S1190).

Through this process, the estimated causes are displayed to the user, and the real cause input by the user may be stored in the vehicle examining device 10.

Meanwhile, the user may select whether to update the mapping model through the input module 120. Upon receiving a command to update the mapping model from the input module 120 (S1200), the cause learning module 300 retrieves the sampling data stored in the sampling data storage unit 430 of the storage module 400 and the mapping model stored in the mapping model storage unit 410 of the storage module 400 (S1210).

Then, the cause learning module 300 updates the mapping model based on the sampling data (S1220) and stores the updated mapping model in the mapping model storage unit 410 of the storage module 400 (S1230).

Through this process, the mapping model may be updated based on the sampling data corresponding to accumulated evaluation results, and the mapping model may be learned. Thus, more accurate estimated causes for the evaluation data may be detected later.

Meanwhile, the vehicle examining device 10 may further include the performance test module 500 to test and optimize performance of the mapping model.

When the vehicle examining device 10 further includes the performance test module 500, the performance test module 500 retrieves the mapping model from the mapping model storage unit 410 of the storage module 400 (S1240), generates test results by calculating grades of the mapping model on the basis of the performance index (S1250), and transmits test results to the display module 110 such that the test results are displayed to the user via the display module 110 (S1260).

Then, the performance test module 500 receives a command to select one mapping model input by the user from the input module 120 and stores the selected mapping model in the mapping model storage unit 410 (S1280).

For example, if the mapping model is an algorithm, the performance test module 500 retrieves the recently updated mapping model and non-updated mapping model from the mapping model storage unit 410 of the storage module 400 (S1240), calculates grades of each mapping model on the basis of the performance index (S1250) and transmits calculation results to the display module 110 as test results (S1260).

In this case, the user may select one mapping model from the updated mapping model and the non-updated mapping model through the input module 120 (S1270), and the performance test module 500 may store the selected mapping model in the mapping model storage unit 410 as a new mapping model (S1280).

In addition, for example, if the mapping model is information including one or more estimated causes corresponding to various evaluation data and the probability, the performance test module 500 retrieves the mapping model stored in the mapping model storage unit 410 of the storage module 400 (S1240), calculates grades of the mapping model on the basis of the performance index according to types of the machine learning algorithm (S1250) and transmits calculation results to the display module 110 as test results (S1260).

In this case, the user may select one machine learning algorithm through the input module 120 (S1270), and the performance test module 500 may store a new mapping model in the mapping model storage unit 410 by applying the selected machine learning algorithm to the mapping model (S1280).

The mapping model may be optimized by the test process of the performance test module 500 as described above.

Hereinafter, a vehicle device including an embedded system to be examined by the vehicle examining device 10 and a vehicle including the vehicle device will be exemplarily described with reference to FIGS. 10 and 11.

Figure 10:
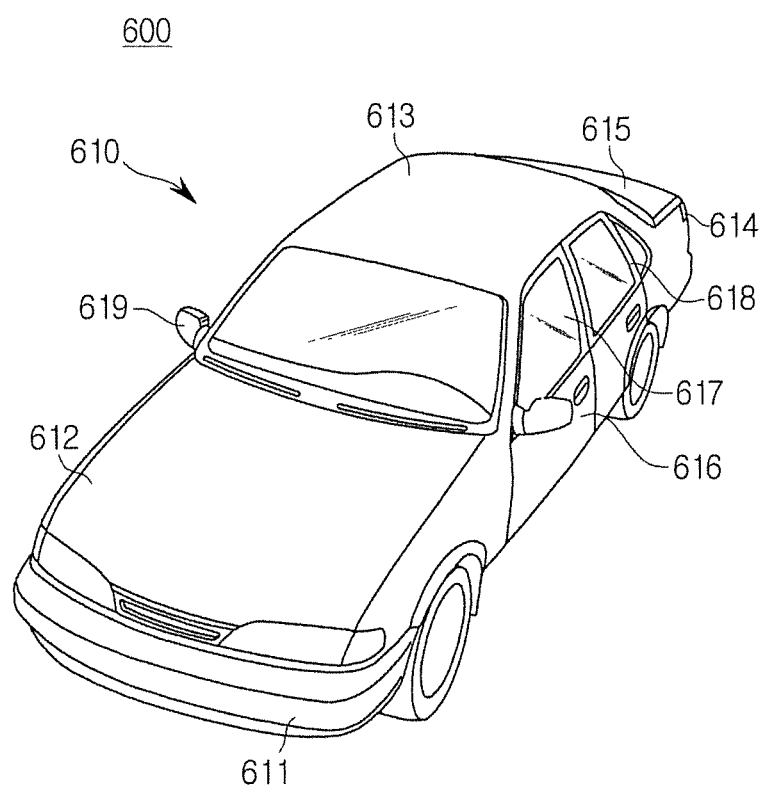
FIG. 10 is an exterior view illustrating a vehicle including an embedded system to be examined by a vehicle examining device according to an embodiment.

FIG. 10 is an exterior view illustrating a vehicle including an embedded system to be examined by a vehicle examining device according to an embodiment. FIG. 11 is an interior view of the vehicle of FIG. 10.

A vehicle 600 is a mobile machine that may transport people or cargo and may travel on roads by driving wheels.

The vehicle 600 may include a body defining an interior and an exterior thereof and a chassis constituting mechanical devices required for driving.

Referring to FIG. 10, an exterior 610 of the body may include a front panel 611, a hood 612, a roof panel 613, a rear panel 614, a trunk 615 and left/right doors 61.

The exterior 610 of the body may further include window glasses 617 respectively installed in the front panel 611, the hood 612, the roof panel 613, the rear panel 614, the trunk 615, the left/right doors 616 and fillers 618 disposed at boundaries between the window glasses 617.

In addition, the window glasses 617 may further include quarter window glasses installed between the fillers that remain unopened, a rear window glass disposed at the rear side and a front window glass disposed at the front side.

The exterior 610 of the body may further include side mirrors 619 configured to provide a driver with rear views of the vehicle 600.

The chassis of the vehicle 600 may include a power generation apparatus, a power transmission apparatus, a driving apparatus, a steering apparatus, a brake apparatus, a suspension apparatus, a transmission apparatus, a fuel supply apparatus and left/right front and rear wheels.

The vehicle 600 may further include various safety apparatuses for the safety of the driver and passengers.

Examples of the safety apparatus of the vehicle 600 include an airbag control apparatus for the purpose of safety of the driver and passengers in a collision of the vehicle 600 and an electronic stability control (ESD) to control a balance of the vehicle 600 during acceleration or cornering.

The vehicle 600 may further include a sensing apparatus, such as a proximity sensor, to detect obstacles or another vehicle present at lateral sides and a rear side of the vehicle 600, and a rain sensor to sense an amount of water.

The vehicle 600 may further include a micro controller able to operate a plurality of stability apparatuses based on operation information of a plurality of safety apparatuses and sensing information of the sensing apparatuses. The micro controller may communicate with a main electronic control unit (ECU) of the vehicle 600.

The vehicle 600 may also include an electronic control unit (ECU) to control operations of the power generation apparatus, the power transmission apparatus, the driving apparatus, the steering apparatus, the brake apparatus, the suspension apparatus, the transmission apparatus, the fuel supply apparatus, various safety apparatuses and various sensing apparatuses.

The vehicle 600 may selectively include electronic devices installed for the convenience of the driver, such as a hands-free device, a global positioning system (GPS) device, an audio device, a Bluetooth device, a rear view camera, a mobile terminal charging device and a high pass device.

The vehicle 600 may further include a multimedia playback apparatus that performs an overall operation of audio functions, video functions and navigation functions.

The multimedia playback apparatus installed in the vehicle 600 may be an audio video navigation (AVN) or a communication terminal device provided with a navigation application.

The vehicle 600 may further include a start/stop button to input an operation command to a starter motor (not shown).

When the start/stop button is turned on, or otherwise activated, the vehicle may operate the starter motor (not shown) and drive an engine (not shown) that is a power generation apparatus via operation of the starter motor.

The vehicle 600 may further include a battery (not shown) electrically connected to a terminal device, an audio device, an interior light, a starter motor and other electronic devices to supply driving power thereto.

The battery is charged using a power generator or driving power of the engine during driving of the vehicle.

Figure 11:
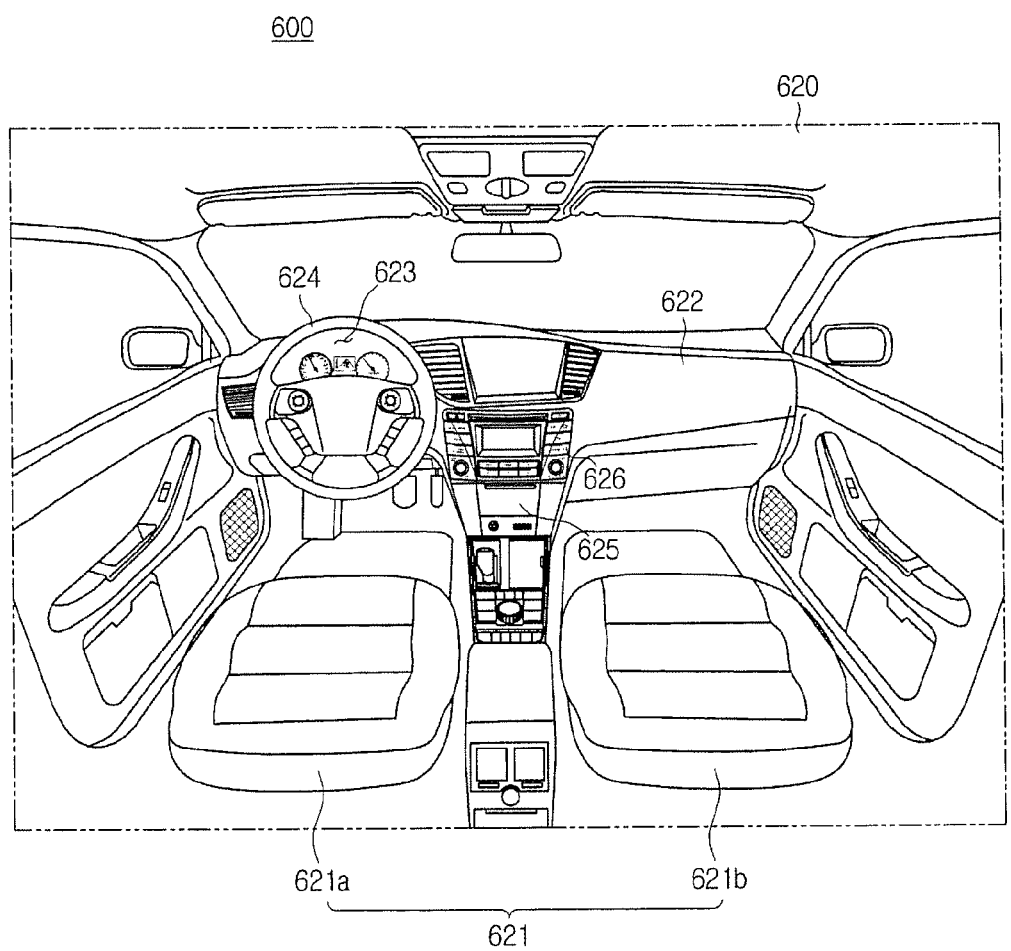
FIG. 11 is an interior view of the vehicle of FIG. 10.

As illustrated in FIG. 11, an interior 620 of the body may be provided with seats 621 (621*a* and 621*b*) on which the driver and passengers sit, a dashboard 622, an instrument cluster 623 disposed on the dashboard 622 and including a tachometer, speedometer, coolant thermometer, fuel gauge, indicator light for direction indicator, high beam indicator light, warning light, seat belt warning light, trip meter, odometer, automatic transmission selector lever indicator light, door open warning light, engine oil warning light, and low fuel warning light, a steering wheel 624 configured to manipulate direction of the vehicle 600, and a center fascia 625 in which an audio control panel and an air conditioner control panel are installed.

The seats 621 include a driver's seat 621*a* on which the driver sits, a front passenger's seat 621*b,* and back seats.

The instrument cluster 623 may be implemented in a digital manner. The instrument cluster 623 implemented in a digital manner displays information about the vehicle 600 and driving information as images.

The vehicle 600 may further include a micro controller to control positions of the seats 621 and the instrument cluster 623 implemented in a digital manner.

The center fascia 625 may be disposed in the dashboard 622 between the driver's seat 621*a* and the front passenger's seat 621*b* and may include a head unit 626 to control operations of the audio device, the air conditioner and heating coils of the seat 621. The head unit 626 may further include a micro controller.

Vents of the air conditioner, and a cigar jack, may be installed in the center fascia 625.

The center fascia 625 may include an interface device that performs data communications between the multimedia playback apparatus and an external apparatus.

In this case, the external apparatus includes a storage device, a mobile communication terminal and an MP3 player.

As described above, the vehicle 600 may have a micro controller to respectively control a plurality of devices installed in the vehicle 600, a micro controller having integrated control of devices interoperable with each other, a main ECU to control an overall operation of the vehicle 600 and an integrated ECU to control a plurality of apparatuses.

In this regard, the micro controllers and embedded software of the ECU may be examined using separate test apparatuses (not shown).

For example, the test apparatus may examine an embedded system to control on/off operations and angles of the side mirrors, an embedded system to control on/off operations of a black box image or an embedded system for an integrated control of a rear view camera and a gear shift level.

The user may input evaluation data to the vehicle examining device 10 based on test results of the test apparatus.

In addition, since the test apparatus and the vehicle examining device 10 may be connected with each other via a wired or wireless communication network, the test results generated by the test apparatus may be directly transmitted to the vehicle examining device 10 as evaluation data.

Here, the 'module' refers to a software element or a hardware element such as a field programmable gate array (FPGA) or an application specific integrated circuit (ASIC), and the module performs predetermined functions. However, the module is not limited to the software or hardware. The module may be configured to be in a storage medium capable of addressing and may also be configured to execute one or more processors.

Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays and variables. The functionality provided in the components, modules and units may be combined into fewer components and modules or may further be separated into additional components and modules. Furthermore, the components and modules may execute one or more central processing units (CPUs) in a device.

Meanwhile, the method of controlling the vehicle examining device 10 may be implemented on a computer-readable recorded medium as computer-readable code. Computer-readable recorded media may include all types of recorded media on which data is stored that may be read by a computer system. Examples may include read only memory (ROM), random access memory (RAM), magnetic tapes, magnetic disks, flash memory, and optical data storage devices, although others are also possible. Also, the computer-readable recorded medium may be distributed across a computer system connected by a computer network, to be stored and executed as code that is read in a distributed manner.

The foregoing description of the present disclosure has been presented for the purposes of illustration and description. It will be understood by those of ordinary skill in the art that the present disclosure may be easily modified into other detailed forms without changing the technical principle or essential features of the present disclosure. Therefore, the foregoing embodiments should be regarded as illustrative rather than limiting in all aspects. For example, each component which has been described as a unitary part may be implemented as distributed parts. Likewise, each component which has been described as distributed parts may be also be implemented as a combined part.

As is apparent from the above description, according to the interface device, the vehicle examining device, and the control method thereof according to an embodiment of the present disclosure, causes of problems occurring in electronic devices installed in a vehicle are automatically analyzed. Thus, accurate causes of problems corresponding to a current examination result may be provided to a user.

According to the interface device, the vehicle examining device, and the control method thereof according to another embodiment of the present disclosure, since causes of problems occurring in the electronic devices installed in a vehicle are automatically analyzed, a user does not need to monitor an examination history for searching for the causes.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A system comprising:
an interface device comprising an input module and a display module; and
a vehicle examining device comprising a storage module configured to store a mapping model, a cause analyzing module configured to analyze one or more estimated causes, and a cause learning module configured to update the mapping model,
wherein the input module receives evaluation data of a vehicle input by a user and receives one estimated cause selected out of the one or more estimated causes as a real cause,
wherein the display module displays the one or more estimated causes corresponding to the evaluation data,
wherein the cause analyzing module stores an evaluation result comprising the evaluation data and the real cause in the storage module,
wherein the cause learning module updates the mapping model based on the evaluation result, and
wherein the input module receives whether to update the mapping model.

2. The system according to claim 1, wherein the input module receives a solution for the real cause input by the user.

3. The system according to claim 1, wherein the interface device further comprises a communication module configured to transmit/receive a signal to/from the vehicle examining device.

4. A vehicle examining device comprising:
a storage module configured to store a mapping model;
a cause analyzing module configured to analyze one or more estimated causes corresponding to evaluation data input by a user based on the mapping model;
a communication module configured to receive the evaluation data input by the user from an interface device and transmit the one or more estimated causes to the interface device; and
a cause learning module configured to update the mapping model, wherein the communication module receives one estimated cause selected by the user out of the one or more estimated causes from the interface device as a real cause, wherein the cause analyzing module stores an evaluation result comprising the evaluation data and the real cause in the storage module, wherein the cause learning module updates the mapping model based on the evaluation result, and wherein the interface device receives whether to update the mapping model.

5. The vehicle examining device according to claim 4, further comprising:
   a display module configured to display the one or more estimated causes to the user; and
   an input module configured to receive another estimated cause selected out of the one or more estimated causes as the real cause from the user.

6. The vehicle examining device according to claim 5, wherein the input module receives a solution input by the user, and
   wherein the cause analyzing module stores an evaluation result comprising the evaluation data, the real cause, the solution and the one or more estimated causes in the storage module.

7. The vehicle examining device according to claim 4, wherein the storage module stores a refined evaluation result as sampling data.

8. The vehicle examining device according to claim 4,
   wherein the storage module stores sampling data respectively corresponding to a plurality of evaluation results, and
   wherein the cause learning module updates the mapping model based on the sampling data.

9. The vehicle examining device according to claim 4, further comprising a performance test module to test performance of the mapping model on the basis of at least one performance index.

10. The vehicle examining device according to claim 4,
    wherein the communication module receives a solution input by the user from the interface device, and
    wherein the cause analyzing module stores the evaluation result comprising the evaluation data, the real cause, the solution, and the one or more estimated causes in the storage module.

11. A method of controlling a vehicle examining device, the method comprising:
    receiving evaluation data of a vehicle from a user by an input module;
    analyzing one or more estimated causes corresponding to the evaluation data based on a mapping model stored in a storage module by a cause analyzing module;
    displaying the one or more estimated causes by a display module;
    receiving one estimated cause selected by the user out of the one or more estimated causes as a real cause by the input module;
    storing an evaluation result comprising the evaluation data and the real cause in the storage module by the cause analyzing module;
    receiving whether to update the mapping model by the input module; and
    updating the mapping model based on the evaluation result by a cause learning module in response to receiving a command of updating the mapping model by the input module.

12. The method according to claim 11 further comprising:
    generating sampling data corresponding to the evaluation result and storing the generated sampling data in the storage module by the cause learning module; and
    updating the mapping model based on the sampling data corresponding to a plurality of evaluation results stored in the storage module by the cause learning module.

* * * * *